United States Patent [19]

Eglise

[11] Patent Number: 4,969,549
[45] Date of Patent: Nov. 13, 1990

[54] DATA-STORING TOKENS AND APPARATUS FOR HANDLING DATA-STORING TOKENS AND COINS

[75] Inventor: David Eglise, Windsor, Great Britain

[73] Assignee: Mars Incorporated, McLean, Va.

[21] Appl. No.: 112,601

[22] PCT Filed: Feb. 5, 1987

[86] PCT No.: PCT/GB87/00088
§ 371 Date: Nov. 20, 1987
§ 102(e) Date: Nov. 20, 1987

[87] PCT Pub. No.: WO87/04831
PCT Pub. Date: Aug. 13, 1987

[30] Foreign Application Priority Data

Feb. 7, 1986 [GB] United Kingdom ............ 8603059

[51] Int. Cl.$^5$ ............................................. G07F 7/00
[52] U.S. Cl. ............................ 194/205; 194/212; 194/213; 194/317; 453/3
[58] Field of Search ............... 194/205, 210, 211, 212, 194/213, 214, 229, 317, 318, 319, 334, 335, 344, 346, 347, 208, 209; 453/3

[56] References Cited

U.S. PATENT DOCUMENTS

| | | | |
|---|---|---|---|
| 1,921,031 | 8/1933 | Hoban | 194/205 X |
| 1,996,143 | 4/1935 | Callison | 194/205 |
| 2,003,349 | 6/1935 | Dumble | 194/210 |
| 2,177,689 | 10/1939 | Dalkin | 194/212 |
| 2,450,997 | 10/1948 | Shann | 194/214 X |
| 3,171,020 | 2/1965 | Lord . | |
| 3,211,267 | 10/1965 | Bayha . | |
| 3,918,565 | 11/1975 | Fougere et al. | 194/317 |
| 4,185,730 | 1/1980 | Ross et al. . | |
| 4,249,648 | 2/1981 | Meyer | 194/212 |
| 4,319,674 | 3/1982 | Riggs et al. | 194/210 |
| 4,601,380 | 7/1986 | Dean et al. | 194/318 |
| 4,674,618 | 6/1987 | Eglise et al. | 194/205 X |

FOREIGN PATENT DOCUMENTS

| | | | |
|---|---|---|---|
| 0147099 | 7/1985 | European Pat. Off. . | |
| 3228225 | 2/1984 | Fed. Rep. of Germany . | |
| 904286 | 8/1962 | United Kingdom . | |
| 1229730 | 4/1971 | United Kingdom . | |
| 1446262 | 8/1976 | United Kingdom . | |
| 2075732 | 11/1981 | United Kingdom . | |
| 2110862 | 6/1983 | United Kingdom . | |
| 2153128 | 5/1984 | United Kingdom . | |
| 2143982 | 2/1985 | United Kingdom . | |
| 2197975 | 6/1988 | United Kingdom | 194/213 |

Primary Examiner—H. Grant Skaggs
Assistant Examiner—Cheryl L. Gastineau
Attorney, Agent, or Firm—Davis Hoxie Faithfull & Hapgood

[57] ABSTRACT

Apparatus for handling coins and tokens comprises a coin validator (4) arranged to detect whether a received item is one of several different coin denominations or a data-storing token, and thereafter to direct coins and tokens to escrow gates (18,22). A token interrogator (6) has antenna coils (24) disposed adjacent one of the escrow gates in order to read data from a token located adjacent the gate. The escrow gates can selectively direct items either to a return chute (16) or a coin store (26).

14 Claims, 2 Drawing Sheets

DATA-STORING TOKENS AND APPARATUS FOR HANDLING DATA-STORING TOKENS AND COINS

This invention relates to tokens and to apparatus for handling tokens.

The invention is particularly but not exclusively concerned with tokens which are generally coin-sized and shaped, and which contain electronic circuitry capable of storing a value which can be read out by an interrogator which communicates with the token in a contactless manner. Preferably, the data stored by the token can also be altered by the interrogator. Examples of such a token and of apparatus for interrogating the token are described in GB-A-2153128 and EP-A-147099.

In the interrogators described in those patent specifications, coins and tokens are inserted into a common path leading to a coin validator. The validator is readily capable of ascertaining that an inserted token does not have physical properties corresponding to any of the coins the validator is programmed to validate. Accordingly, the inserted token is caused to be delivered to a reject path. The interrogator is disposed along the reject path so that any tokens and non-genuine coins are received by the interrogator. The interrogator detects the presence of a received token or rejected coin, attempts to interrogate the item and if no response is received (i.e. if the received item is a non-genuine coin rather than a token) the item is delivered to a return chute. If the received item is a token, interrogation takes place before the item is returned to the user via the return chute.

Such an arrangement is very convenient in some installations, particularly when it is desired to convert certain types of existing coin validation apparatus to render them capable of handling tokens.

It has now been found, however, that there is a different arrangement which is more desirable in many circumstances.

According to one aspect of the invention there is provided coin validation apparatus for discriminating between acceptable coins and non-acceptable items, the apparatus additionally being able to discriminate tokens and being operable to direct the discriminated tokens along a path leading to a token interrogator, which path is different from a path along which said non-acceptable items are directed. The tokens may be directed along the same path as at least one acceptable coin denomination. The path may lead to a gate, desirably an escrow gate, from which the coins and tokens can be selectively directed either to a store (such as a cashbox) or to a return chute for return to the user.

According to another aspect of the invention apparatus for handling coins and data-storing tokens is operable to measure a property of received items, to recognise a received item as a coin of a particular denomination in dependence upon whether a measured property lies within a range associated with that denomination, and to recognise a received item as a token in dependence upon whether a measured property lies within a further range associated with the token. In the preferred embodiment, the validator stores a particular parameter range for a coin denomination, and recognises an inserted item as that coin denomination if the measured property lies within that range. Preferably, the validator stores ranges associated with different properties, and recognises the coin only if all of a plurality of measured properties fall within the respective parameter ranges. Other ranges are preferably stored to enable detection of other coin denominations. In addition, the validator stores a range specifically associated with the tokens (or a plurality of ranges each associated with a different measured property of the tokens). Accordingly, a data-storing token can be recognised just as though it were a different denomination of coin.

According to a still further aspect of the invention, apparatus for handling coins and tokens comprises a coin validator arranged to receive both coins and tokens, an interrogator positioned to receive tokens from the validator, and means for initiating the operation of the interrogator in response to the validator detecting that a received item is a token. Preferably, the validator segregates the tokens from rejected coins. It may also segregate at least one denomination of coins from the tokens.

According to a yet further aspect of the invention, there is provided apparatus for handling coins and tokens, the apparatus including a test station at which tokens can be interrogated to determine data stored thereby, the apparatus being arranged to deliver both coins and tokens to the test station and having means for selectively directing items at the test station either to a first path or a second path, the first path preferably being arranged to return the items to a user and the second path preferably being arranged to direct the items to a store where they are retained. The selective directing means may be an escrow gate which is operated during or after a transaction.

The invention also extends to tokens suitable for use in any such apparatus. The tokens preferably incorporate electronic circuitry, preferably store data in an alterable manner, can preferably be interrogated in a contactless manner and preferably have physical properties such that they can be recognised by a coin validator.

Embodiments of the invention preferably combine some, and more preferably all, of the above aspects.

A specific embodiment to be described below has a coin validator arranged to receive both coins and electronic tokens, and is operable to measure physical properties of received items to determine whether an item is one of several denominations of coins or an electronic token. If an item is none of these, it is delivered to a reject path whereby it is returned to the user. If an item is a token it is delivered to an interrogator located in proximity to a gate at which the token is halted while it is interrogated. The gate preferably also serves as an escrow gate, whereby the token is retained until a transaction is completed, or possibly until the token value has been expended, whereupon the value stored by the token is updated in accordance with the value expended as a result of the transaction, and the token is then delivered to a refund chute for return to the user. Preferably, if the updated value of the token is zero the token is instead delivered to a store or cashbox.

In the preferred embodiment, coins of one or more specific denominations are also delivered to the same escrow gate, from which they can be either sent to the cashbox or returned to the user as is known per se in prior art escrow gate arrangements.

Other denominations of coins can be delivered to one or more other paths, each of which may contain a respective escrow gate.

Such an arrangement gives rise to a number of advantages. The rate at which the apparatus is capable of rejecting items which are neither genuine coins nor tokens is substantially increased compared with the arrangement described in GB-A-2153128, because the coin validator segregates the rejected items which therefore no longer have to be checked by the token interrogator. In order to save current consumption, the interrogator is preferably powered only when needed. The above embodiment avoids the need for powering up the interrogator every time a non-genuine coin is inserted.

It is known to arrange coin validators so that power consumption is reduced by powering up certain parts of the circuitry only when the arrival of a coin has been sensed. In the arrangement described above, this same arrival sensor would operate to power up the appropriate parts of the validator following arrival of a token. There is no need for a separate, permanently powered arrival sensor to detect arrival of items at the interrogator.

A further important advantage of the arrangement set out above is that the electronic token is subject both to property measurement by the validator and interrogation by the interrogator, so that it becomes very difficult to construct fraudulently an item which would be accepted by the apparatus as a genuine token.

Another advantage of the arrangement mentioned above is that the structure becomes very compact, particularly if the same escrow gate is used both for coins and tokens. Such an arrangement also renders simple the modification of existing structures incorporating escrow gates to allow them to handle tokens.

Contemporary validators are generally very good at discriminating between genuine and non-genuine coins. It will therefore be appreciated that any electronic datastoring token would not be recognisable to a conventional validator. Indeed, the physical properties of an electronic token would be likely to be so different from the properties of a genuine coin that the arrival sensor mentioned above would not be operated by the arrival of the token, and consequently the coin validator would not be powered up so that it would not even "see" the token.

It is very desirable that some of the physical properties of a token according to the present invention be relatively close to those of genuine coins. Otherwise, conventional validator circuits would have to be adapted to enable recognition of the tokens. In addition, a validator which was required to recognise tokens having widely different properties from coins would have to operate over such a large bandwidth that its discrimination of genuine coins would be deteriorated.

Thus, in accordance with a further aspect of the invention, a token having data-storing circuitry incorporates a conductive member for rendering the token recognisable to a coin validator. The member is preferably centrally disposed in the token and may for example be generally cylindrical.

The conductive member is preferably non-magnetic, and may be made of metal, such as copper or brass, or ferrite. There is preferably a printed circuit board carrying at least some of the circuit components of the token, the board being disposed around the conductive member.

In a preferred embodiment, the conductive member extends right through the thickness of the token. Preferably the member itself and the token are concentric. The member could be a slug or pellet, or alternatively could be formed by a rivet.

The presence of the conductive member renders the token detectable by the coin validator. By disposing the conductive member in the middle of the token and concentric therewith, the physical properties detected by the validator are substantially constant irrespective of the orientation of the token. In addition, as explained further below, the token can be arranged so that those physical properties individually detected by respective coin sensors may correspond to or at least approach the properties of genuine coins, but may when taken together be very easily distinguishable from the combinations of properties found for genuine coins so that there is no danger of confusion between them.

In the above-described arrangement, the tests performed by the coin validator to validate coins are sufficient also to recognise the presence of tokens. In an alternative arrangement, separate tests are carried out to detect tokens and to validate coins. The validator may have a separate sensor which is used solely for detecting tokens. This may for example be an inductive sensor. Preferably the token incorporates a tuned circuit, and the inductive sensor is driven at a frequency substantially equal to that of the tuned circuit. Accordingly, when the token passes a sensor a significant alteration in the sensor output is caused.

The token preferably has a coil arranged to act as an antenna during interrogation, as in the arrangement described in GB-A-2153128, and preferably the token is arranged so that both data and power are received from the interrogator by means of the antenna.

The antenna coil may be used in place of the conductive member referred to above, for making the token recognisable to the coin-validating sensing circuitry of the coin validator. In the alternative arrangement described above in which the token incorporates a tuned circuit for detection by a separate sensor, the antenna coil may form part of this tuned circuit.

An arrangement embodying the invention will now be described by way of example with reference to the accompanying drawings, in which.

Figure 1:
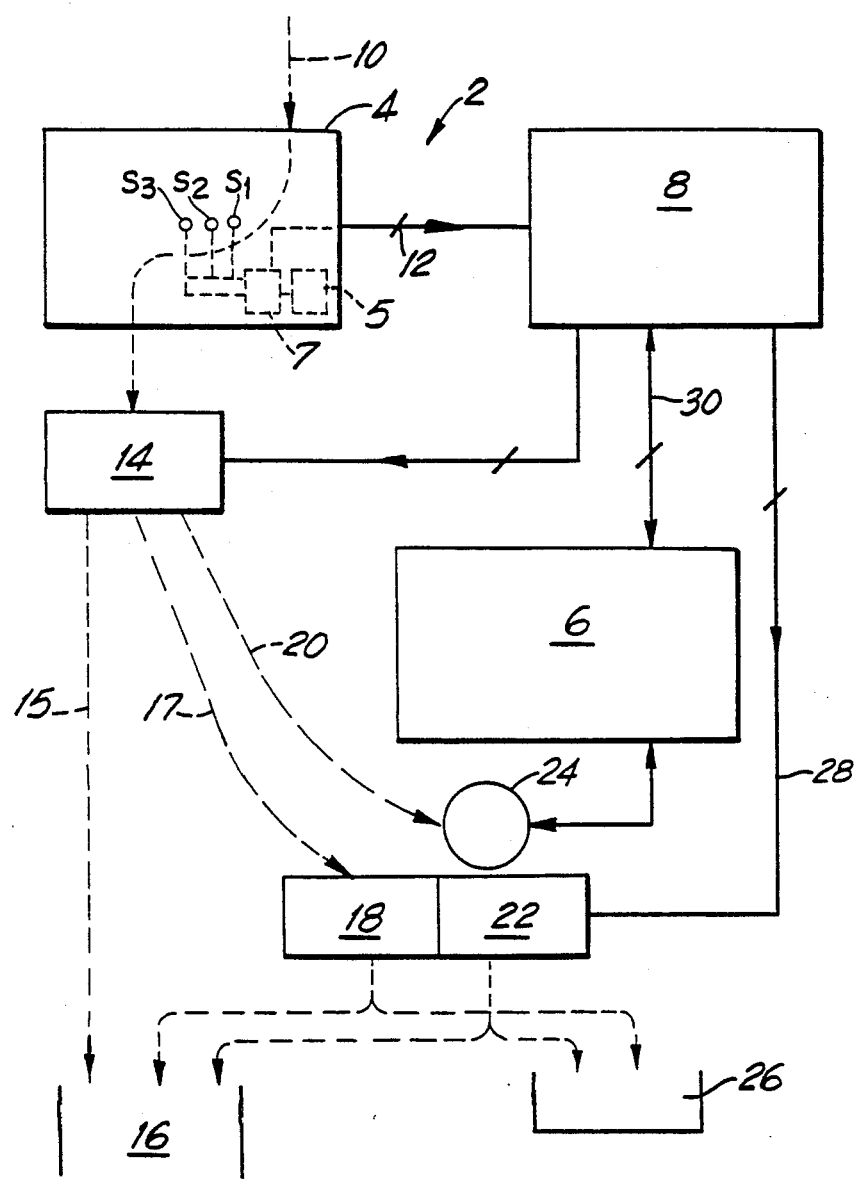
FIG. 1 is a block diagram of apparatus in accordance with the invention for handling both coins and electronic data-storing tokens.

Referring to FIG. 1, the apparatus 2 comprises a coin validator 4 which may for example be of the type described in GB-A-2093620. The apparatus also includes a token interrogator 6 which is substantially identical to that of the embodiment of FIGS. 5 to 8 in GB-A-2153128.

The present invention is of particular value when applied to payphones. The apparatus of the present embodiment is used in a payphone, and incorporates a payphone controller 8. The controller 8 is arranged to permit use of a telephone (not shown) when a user has inserted a coin or a token storing a credit value. Except insofar as is described below, the controller 8 operates in substantially the same way as controllers in existing payphones which operate upon insertion of coins or magnetically encoded debit cards.

Coins and tokens are inserted into the apparatus via a common path 10. When an item is inserted, it is delivered first to the validator 4. Assuming that the item is conductive and has appropriate physical parameters, its presence is sensed by an arrival/thickness sensor S1 and appropriate circuitry within the validator 4 is powered up. In particular, a further two testing stations, incorporating material and diameter sensors S2 and S3, are actuated, so that in all three tests are performed on the item. Accordingly, three measured property values are obtained.

The validator 4 has a memory storing six sets of parameters. Each set consists of three ranges, each of which is defined by upper and lower limit values stored in the memory. The first five sets are associated with the U.K. coin denominations 5p, 10p, 20p, 50p and £ 1. The sixth set is associated with the token that is intended to be handled by the apparatus.

The validator 4 checks the measured properties against the ranges within each set. If all three measured properties fall within the three respective ranges of one particular set, the item is accepted as being either a token or one of the five coin denominations, depending upon which set contains the three ranges within which the properties fall.

Instead of storing the upper and lower limit values for each range, other techniques are possible. For example, the memory could store a single value, the validator having circuitry for calculating the upper and lower limits from that value using either a predetermined or stored tolerance value.

The validator has a number of output lines indicated at 12 for carrying signals to indicate that an inserted item has been accepted, and also to indicate which set of ranges contain all the measured properties (i.e. whether or not the item was a token, and if not what the denomination of the accepted coin was).

The controller 8 responds to the signal by selectively actuating a plurality of solenoids indicated at 14. If the controller 8 receives a signal indicating the receipt of a token, the token reading means, interrogator 6, is powered up.

If the inserted item was not found acceptable, no solenoids are operated and the item falls straight through to a reject path 15, whereupon the item is returned to the user via a refund chute 16.

If the inserted item was accepted and found to be a 5p, 10p or 20p coin, the solenoids 14 are so actuated as to cause the item to be delivered along a path 17 to an escrow gate indicated at 18.

If the inserted item was either a 50p coin, a £ 1 coin or a token, the solenoids 14 are so actuated as to deliver the item to a path 20 leading to an escrow gate 22. Items arriving at the escrow gate 22 can be interrogated using a pair of inductive coils indicated schematically at 24, the coils being connected to the interrogator circuitry 6.

The escrow gates 18 and 22 can be operated in a known manner to release an item held thereby into either the refund chute 16, where the item is returned to the user, or a cashbox 26. This is carried out under the control of the payphone controller 8 linked to the escrow gates via control lines indicated at 28.

The apparatus acts as a standard payphone used in coin-operated telephones except when a token is inserted. As coins are inserted, the payphone controller accumulates a credit count representing the total value of the coins inserted, and the coins are delivered to the appropriate escrow gate so that in some circumstances a plurality of coins may be stacked in turn at each escrow gate. The controller also preferably stores information indicating what items are held by the escrow gates and the sequences in which they are arranged. The controller allows use of the telephone and calculates the cost of the telephone call. The call is of course terminated if the cost reaches the accumulated credit. Otherwise, at the end of the call, the cost is deducted from the credit and if sufficient remains appropriate coins are returned to the user from one or both of the escrow gates after the other coins have been delivered to the cashbox 26.

If a token is inserted, either alone or in addition to a number of coins, the credit value is not incremented until the token has reached the escrow gate 22, has been interrogated and found to be valid and has further been found to have stored therein a token credit value. In these circumstances the token credit value is added to the credit stored in the payphone controller, whereas the value in the token itself is cleared.

At the end of the call, if any credit remains it is written into the token using the interrogator, and the token is refunded to the user. Otherwise, the token is delivered to the cashbox.

Assuming that the apparatus is designed so that one or more coins can be inserted and accepted in addition to a token, the arrangement is preferably such that the amount of credit written into the token at the end of the call never exceeds the amount read out therefrom. This can be facilitated by so controlling the escrow gates that as much as possible of the cost of the call is paid for by the inserted coins, rather than the credit value stored in the token.

In an alternative arrangement, the escrow gates are selectively actuated during the telephone call so as to pay for the call, so that the controller need not calculate the total value of the inserted coins. Thus, if a coin or token is present adjacent either of the escrow gates 18 and 22, the payphone controller 8 permits use of the telephone for a period for which the cost corresponds to the largest denomination coin adjacent an escrow gate (or corresponding to the credit in the token if a token is adjacent the escrow gate 22). At the end of that period, the largest denomination coin, or token, as appropriate, is then sent to the cashbox 26. The operation then continues until the call is terminated by the user or until there is no coin or token present at either of the escrow gates.

In payphones, power consumption is very important. The validator 4 and interrogator 6 together consume a large amount of power relative to that available. The present embodiment is arranged so that at no time are the validator and interrogator both in operation.

When a token has been received by the validator, the payphone controller is operable to power up the interrogator by delivering thereto a signal on one of a plurality of lines 30. The signal is delayed slightly so as to allow time for the power to the validator to switch off following the validation operation. If desired, the payphone controller could be arranged to inhibit any powering up of the validator, and thereby inhibit acceptance of any coins, during the time that the interrogator is switched on.

The present embodiment is arranged so that both coins and tokens can be delivered to the escrow gate 22. Accordingly, if a token is sent to the escrow gate 22 after a coin has already been sent there, the token will be stacked behind the coin and therefore will not be adjacent the interrogator coils 24. It would therefore not be appropriate to power up the interrogator at this time. To deal with this, the controller 8 may use its stored information concerning the items which have been sent to the escrow gate 22. Each time an item is released from the escrow gate 22, the controller 8 checks the stored information to determine whether the next item is one which the validator has determined to be a token. If so, the interrogator 6 is powered up.

Alternatively, the interrogator 6 can be arranged to be powered up each time a new item arrives at the interrogator coils 24. A correct response will be received only if the item is a valid token.

The controller 8 may alternatively be arranged such that during the course of a single use of the apparatus only coins are delivered, or only a token is delivered, to the escrow gate 22, so that there is never a mixture of coins and tokens sent thereto. Indeed, the apparatus could be arranged so that during a single transaction it is not possible to use both coins and tokens. Accordingly, if the first accepted item is a coin, subsequently inserted tokens are not accepted. Correspondingly if the first item is a token, subsequently inserted coins are not accepted.

Figure 2:
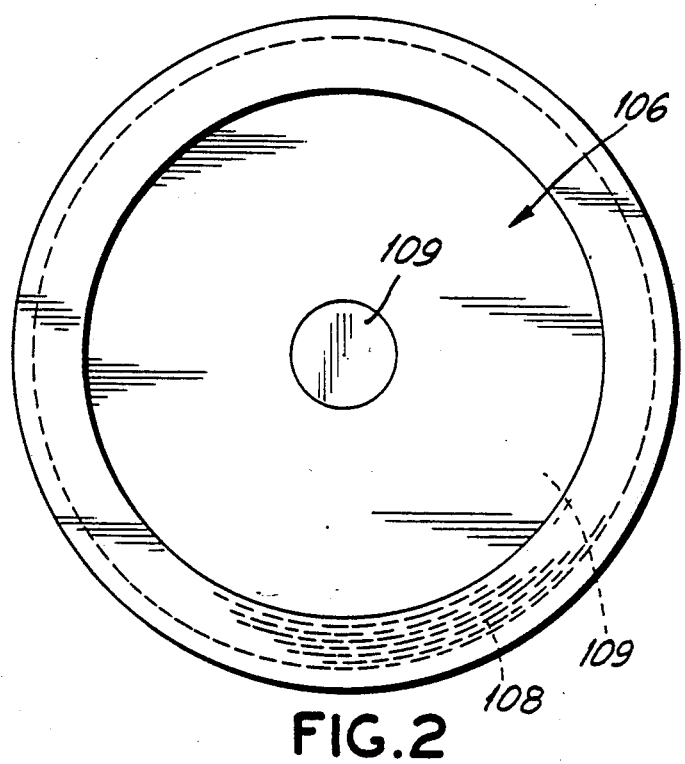
FIG. 2 is a plan view of a token which can be handled by the apparatus of FIG. 1.
Figure 3:
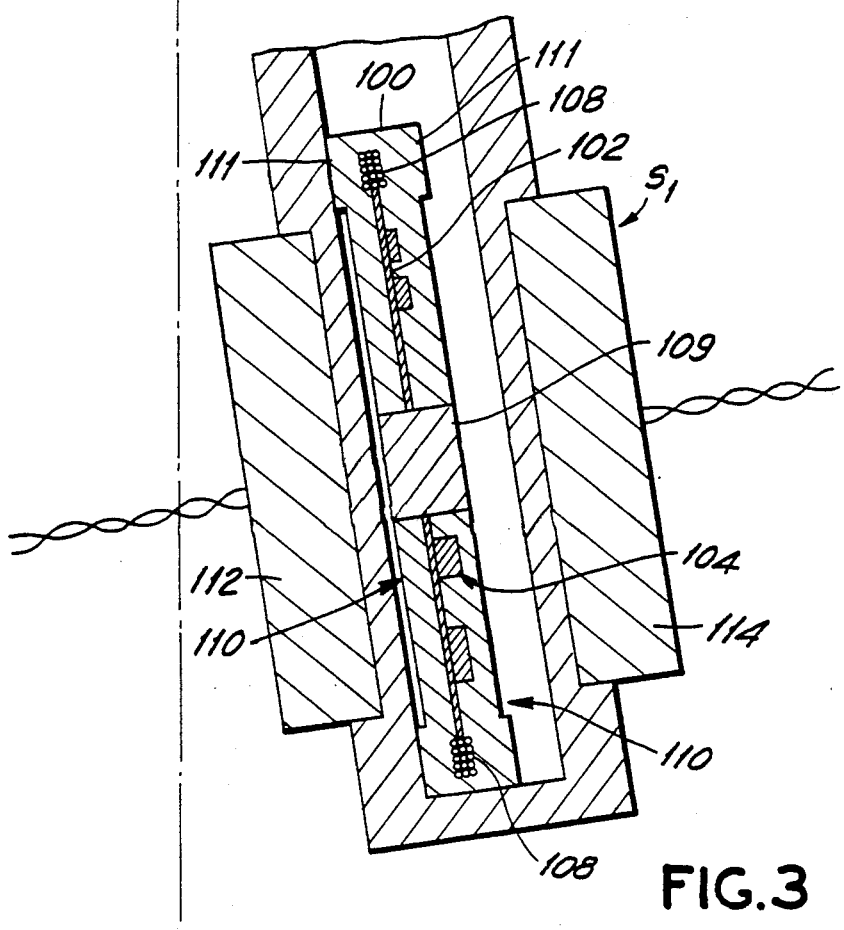
FIG. 3 is a section through the token of FIG. 2, showing the token within a coin path of the apparatus of FIG. 1.

Referring to FIGS. 2 and 3, the token is indicated generally at 100. The token is generally disc-shaped and includes an annular double-sided printed circuit support or film 102, e.g. of P.V.C., fibreglass or Kynvar (Registered Trade Mark) having thereon a printed circuit on which is surface mounted a number of components indicated generally at 104. The circuit is coupled to an antenna coil indicated at 108 which encircles the printed circuit support and which has an inner diameter greater than the outer diameter of the support 102. A cylindrical, brass pellet 109 is disposed at the centre of the token 100 and concentrically therewith, within the inner periphery of the printed circuit support 102. The pellet 109 forms a conductive member which is used to render the token recognisable to the validator.

The printed circuit support 102, circuit components 104, antenna coil 108 and pellet 109 are encapsulated in a plastics housing indicated at 110. The housing is disc-shaped and has a diameter of from 20 to 30 mm and an overall thickness including rims indicated at 111 of from 2.0 to 3.0 mm. The pellet 109 has a diameter of from 4 to 6 mm, preferably substantially 5 mm, and a length of preferably 1.8 to 2.8 mm, more preferably substantially 2.5 mm, which length is preferably equal to the thickness of the body of the token in its central region so that the ends of the pellet 109 are flush with the central regions of the token housing.

The first testing station of the coin validator 4, incorporating the sensor S1, is shown in FIG. 3. The sensor S1 is formed of a pair of inductance coils indicated schematically at 112 and 114 and located on opposite sides of the coin path. As shown, the path is slightly canted so that the coins and tokens roll along one side wall thereof, in closer proximity to one of the coils 112 than to the other 114. This is to ensure substantially reliable positioning of the coins and tokens so as to get consistent test results. Because the pellet 109 is symmetrical about the axis of the housing, the actual position of the housing around its axis as it passes the coils does not alter the effect of the pellet on the coils.

Those properties of the token 100 which are detected by the thickness sensor S1 correspond approximately to the properties which would be detected if a thin copper coin were to be inserted. This is because the pellet, although quite thick, is spaced by the token rim from the side wall of the coin path and is of small diameter and located well within the areas of the coils 112 and 114, so that it would not have as great an effect as a conductive disc of the same thickness whose diameter was such that, as it rolled along the ramp, it covered a large area of the coils. In addition, because the surface area of the pellet is small, it will produce a small diameter reading from the diameter sensor. The consequence of this is that a conductive disc which would produce from the diameter sensor a reading corresponding to that of the token would necessarily have a small diameter and therefore would pass below the thickness sensor and thus not produce a reading from the thickness sensor. Thus, the pellet enables recognition by the validator of the token, but avoids the possibility of confusion with genuine coins.

Instead of the pellet 109 illustrated, a rivet could be used. This would have a relatively thin shank passing through a small-diameter hole in the printed circuit support 102, and relatively large-diameter heads for retaining the rivet in position.

The use of a pellet or rivet has the added advantages of increasing the weight of the token so that it approaches that of the lighter forms of genuine coins, and of not substantially interfering with the coupling between the antennas of the token and interrogator.

The pellet 109 may be omitted if the remainder of the token is arranged so as to produce sufficient readings from one or more of the sensors S1, S2 and S3. For example, the antenna coil 108 may be designed to produce adequate sensor readings.

Alternatively, a separate sensor, which is not used for coin validation, may be provided specifically for detecting tokens. Preferably this is an inductive sensor coupled to an oscillator operating at a frequency substantially equal to the resonant frequency of a tuned circuit in the token 100, such tuned circuit preferably including the antenna coil 108. The sensor may be positioned at any location between the entry and exit of the coin validator 4, either before, after or between the sensor coils S1, S2 and S3.

I claim:

1. An apparatus for handling coins and tokens, the apparatus comprising:
   a control means;
   a coin validator having an entry path for receiving items such as acceptable coins, data-storing tokens and nonacceptable items, said coin validator further including discriminating means for discriminating between said items, said discriminating means including output means providing a different signal to said control means dependent upon which item is received;
   separating means controlled by said control means, for receiving items from said coin validator and selectively directing said data-storing tokens to a first exit path and non-acceptable items to a second exit path;
   said control means being responsive to said signal at said output means such that if said signal indicates the receipt of a data-storing token, said control means causes said separating means to direct said data-storing token to said first exit path and if said signal indicates the receipt of a non-acceptable item, said control means causes said separating means to direct said non-acceptable item to said second exit path;

a token station positioned along said first exit path for receiving said data-storing token to enable data to be read from said token; and token reading means at said token station for reading said data-storing token.

2. The apparatus of claim 1, wherein if said signal indicates the receipt of an acceptable coin, said control means causes said separating means to direct said acceptable coin to said first exit path.

3. The apparatus of claim 1, further comprising a third exit path, wherein said discriminating means provides a signal of a first type at said output means if a coin received from said entry path is of a first denomination, and a signal of a second type if a coin received from said entry path is of a second denomination, said separating means selectively directing items to said first, said second, or said third exit path, and wherein said control means causes said separating means to direct a coin to said first exit path if said signal is of the first type and to said third exit path if said signal is of the second type.

4. The apparatus of claims 1, 2, or 3, further comprising a return path for delivering an item from said token station to a user, a store path for delivering an item from said token station to a store, and gate means at said token station for selectively directing an item at said token station to said return path or said store path.

5. The apparatus of claim 4, wherein said gate means is an escrow gate, and means are provided to operate said escrow gate following a transaction.

6. The apparatus of claim 4, further comprising means for writing data onto a token at said token station, whereby said token may be updated before being delivered via said return path to the user.

7. The apparatus of claims 1, 2 or 3, wherein said control means generates an initiating signal in response to the signal at said output means of said discriminating means indicating receipt of a token, said token reading means initiating a token reading operation in response to said initiating signal.

8. The apparatus of claim 7, wherein said initiating signal is operable to cause the powering-up of said token reading means.

9. The apparatus of claim 8, further comprising means for powering-down said validator while said token reading means is powered.

10. The apparatus of claims 1, 2 or 3, wherein said discriminating means further comprises sensing means, storage means for storing coin parameter ranges and a token parameter range and checking means coupled to said sensing means and said storage means for comparing signals from said sensing means with said stored parameter ranges.

11. A combination of an apparatus for handling coins and tokens, and a data-storing token, said apparatus comprising;

a coin validator, said coin validator having an entry path for receiving items such as acceptable coins, data-storing tokens and non-acceptable items, said coin validator further including discriminating means for discriminating between said items, said discriminating means comprising sensing means, storage means for storing coin and token parameters, checking means coupled to said sensing means and said storage means for comparing signals from said sensing means with said stored parameters, and output means responsive to said checking means for providing a different signal dependent upon whether said item received from said entry path is an acceptable coin, a data-storing token or a non-acceptable item;

separating means for receiving items from said coin validator;

first and second exit paths, said separating means being able to selectively direct items to said first exit path or said second exit path based on said signal from said output means;

control means responsive to said signal at said output means for controlling said separator means, said control means causing said separating means to direct an item to said first exit path if said signal indicates that said item is a data-storing token, and to said second exit path if said signal indicates that said item is a non-acceptable item;

a token station positioned along said first exit path for receiving said data-storing token to enable data to be read from said token;

token reading means at said token station for reading said data-storing token; and said data-storing token having physical properties such that when said token is in proximity with said sensing means, said sensing means provides signals corresponding to said stored token parameters.

12. A combination of an apparatus for handling coins and tokens and a data-storing token, said apparatus comprising;

a coin validator having an entry path for receiving items such as acceptable coins, data storing tokens and nonacceptable items, discriminating means for discriminating between said items, said discriminating means comprising an inductive sensor, storage means for storing coin and token parameters, checking means coupled to said sensing means and said storage means for comparing signals from said sensing means with said stored parameters, and output means responsive to said checking means for providing a signal which differs in dependence upon whether an item received from said entry path is an acceptable coin, a data-storing token or a non-acceptable item;

separating means for receiving items from said coin validator;

first and second exit paths, said separating means being able to direct items selectively to said first exit path or said second exit path;

control means responsive to said signal at said output means of said discriminating means for controlling said separator means, said control means being arranged to cause said separating means to direct an item to the first exit path if said signal indicates that the item is a data-storing token, and to said second exit path if said signal indicates that the item is a nonacceptable item;

a token station positioned along said first exit path for receiving said data-storing token to enable data to be read from said data-storing token;

token reading means at said token station for reading said data-storing token; and said data-storing token comprising a conductive member for being sensed by said inductive sensor, said conductive member causing said sensor to generate signals for comparison with said token parameters, which lie within a range for acceptable tokens.

13. The combination of claim 12, wherein said token comprises a housing having an axis, and wherein said conductive member is disposed symmetrically with respect to said axis.

14. The combination of claims 12 or 13, wherein said conductive member is a substantially cylindrical pellet.

* * * * *

UNITED STATES PATENT AND TRADEMARK OFFICE
CERTIFICATE OF CORRECTION

PATENT NO.  : 4,969,549

DATED       : November 13, 1990

INVENTOR(S) : David Eglise

It is certified that error appears in the above-identified patent and that said Letters Patent is hereby corrected as shown below:

Column 3, line 37, delete "datastoring" and insert --data storing--.

In the Claims:

Claim 1, column 8, line 48, delete "nonacceptable" and insert --non-acceptable--.

Claim 4, column 9, line 21, delete "," following "2".

Claim 12, column 10, line 28, delete "nonacceptable" and insert --non-acceptable--.

Claim 12, column 10, line 50, delete "nonacceptable" and insert --non-acceptable--.

Signed and Sealed this

Seventh Day of July, 1992

Attest:

DOUGLAS B. COMER

*Attesting Officer*   *Acting Commissioner of Patents and Trademarks*